(12) United States Patent
Weeks

(10) Patent No.: US 6,209,181 B1
(45) Date of Patent: Apr. 3, 2001

(54) BOILER TUBE FLARE-END SEGMENT PEELER TOOL

(75) Inventor: Bruce V. Weeks, Pataskala, OH (US)

(73) Assignee: Advanced Cutting Technologies, Ltd., Westerville, OH (US)

( * ) Notice: Subject to any disclaimer, the term of this patent is extended or adjusted under 35 U.S.C. 154(b) by 0 days.

(21) Appl. No.: 09/416,692

(22) Filed: Oct. 12, 1999

(51) Int. Cl.⁷ ...................................... B23P 15/26
(52) U.S. Cl. ...................... 29/33 T; 29/727; 29/726; 29/890.031
(58) Field of Search ................... 29/890.031, 726, 29/727, 33 R, 33 T, 723, 426.4, 252; 83/54, 181, 199, 195

(56) References Cited

U.S. PATENT DOCUMENTS

| | | | |
|---|---|---|---|
| 3,835,520 | * 9/1974 | Sismore | 29/726 |
| 3,857,158 | * 12/1974 | Costello | 29/890.031 |
| 4,967,468 | * 11/1990 | Vossbrinck et al. | 29/726 |
| 5,205,038 | * 4/1993 | Archer et al. | 29/890.031 |
| 5,826,334 | * 10/1998 | Weeks et al. | 29/890.031 |
| 5,826,335 | * 10/1998 | Tegethoff et al. | 29/890.031 |
| 5,974,642 | * 11/1999 | Weeks et al. | 29/33 T |

* cited by examiner

*Primary Examiner*—I Cudy
*Assistant Examiner*—Trinh Nguyen
(74) *Attorney, Agent, or Firm*—Thomas S. Baker, Jr.

(57) ABSTRACT

A boiler tube peeler tool assembly useful in connection with the removal of boiler tube flared-end segments from retention within power boiler header walls is provided with a tool body subassembly, a clamp subassembly carried by the tool body subassembly and having pairs of clamp expansion jaws that engage the boiler tube flared-end segment interior surface, a peeler blade subassembly that bends and shears retained longitudinal gap metal from retention by the boiler tube flared-end segment, and a conventional pressurized-fluid actuator for reciprocally powering the peeler blade subassembly.

7 Claims, 6 Drawing Sheets

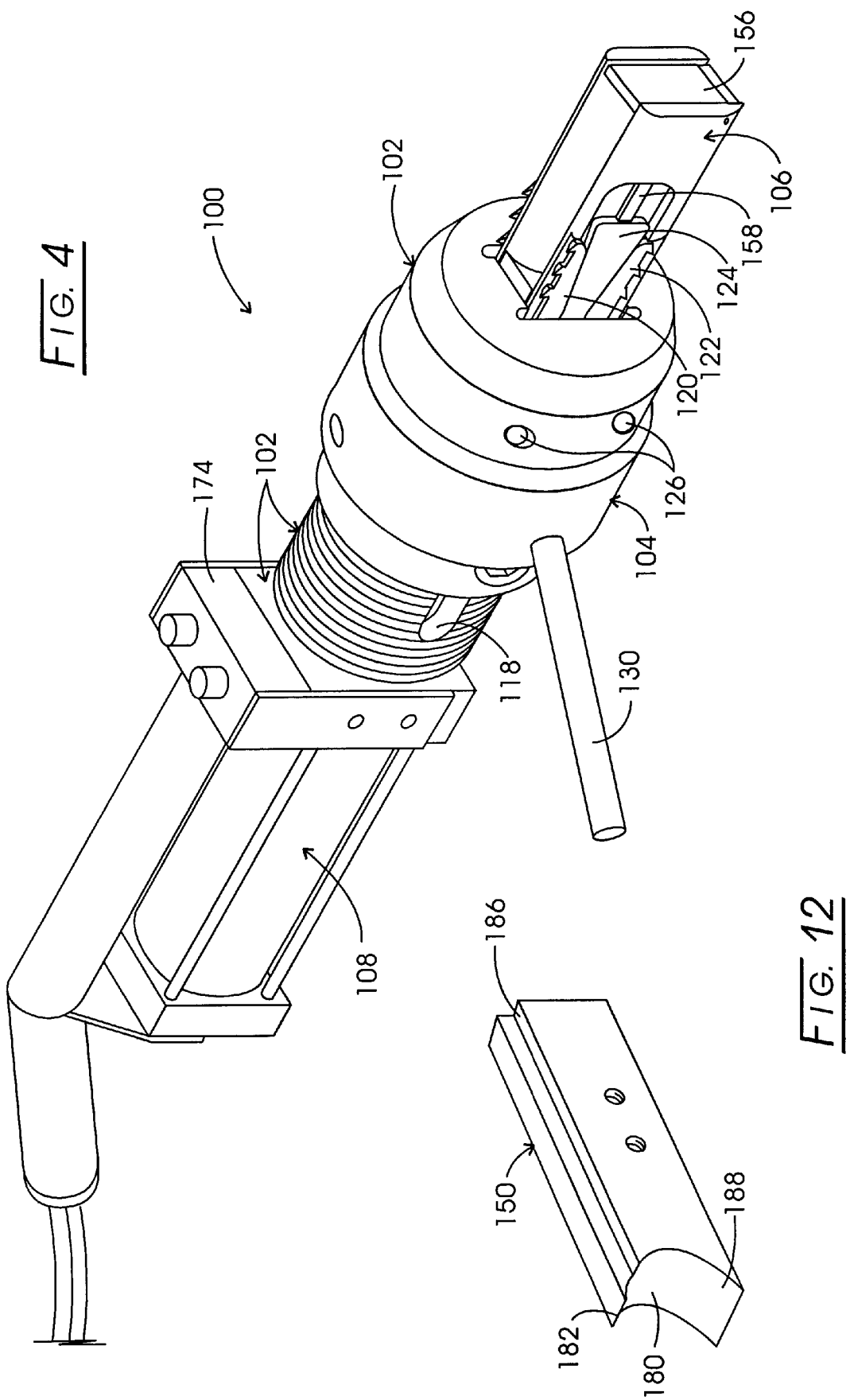

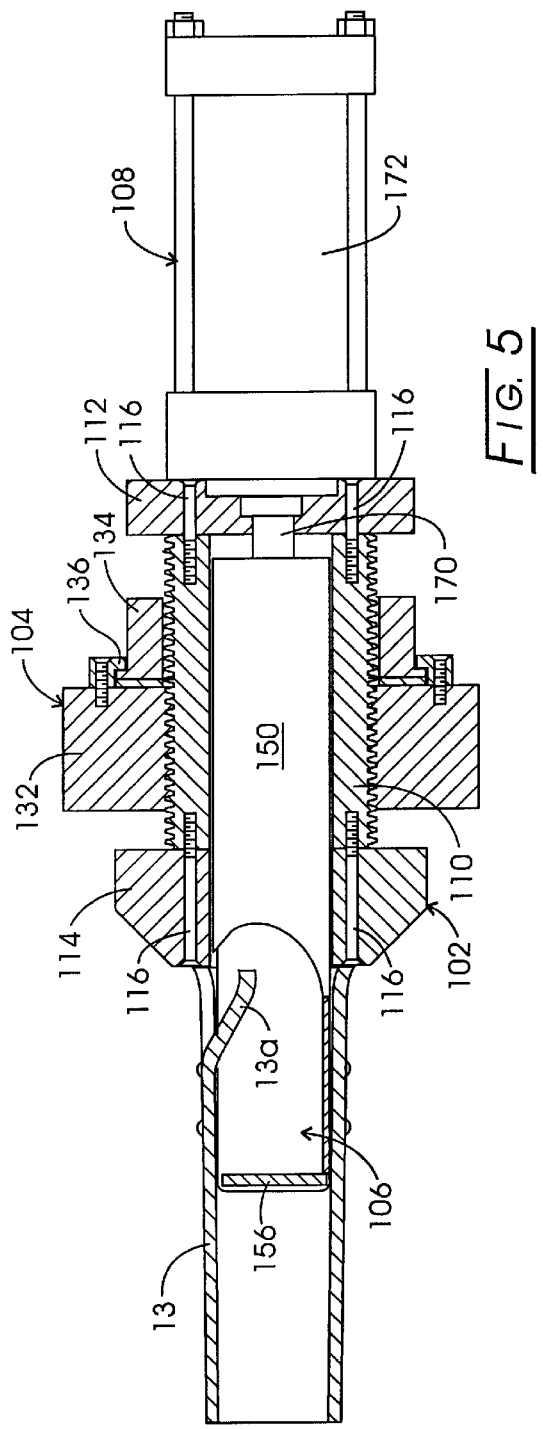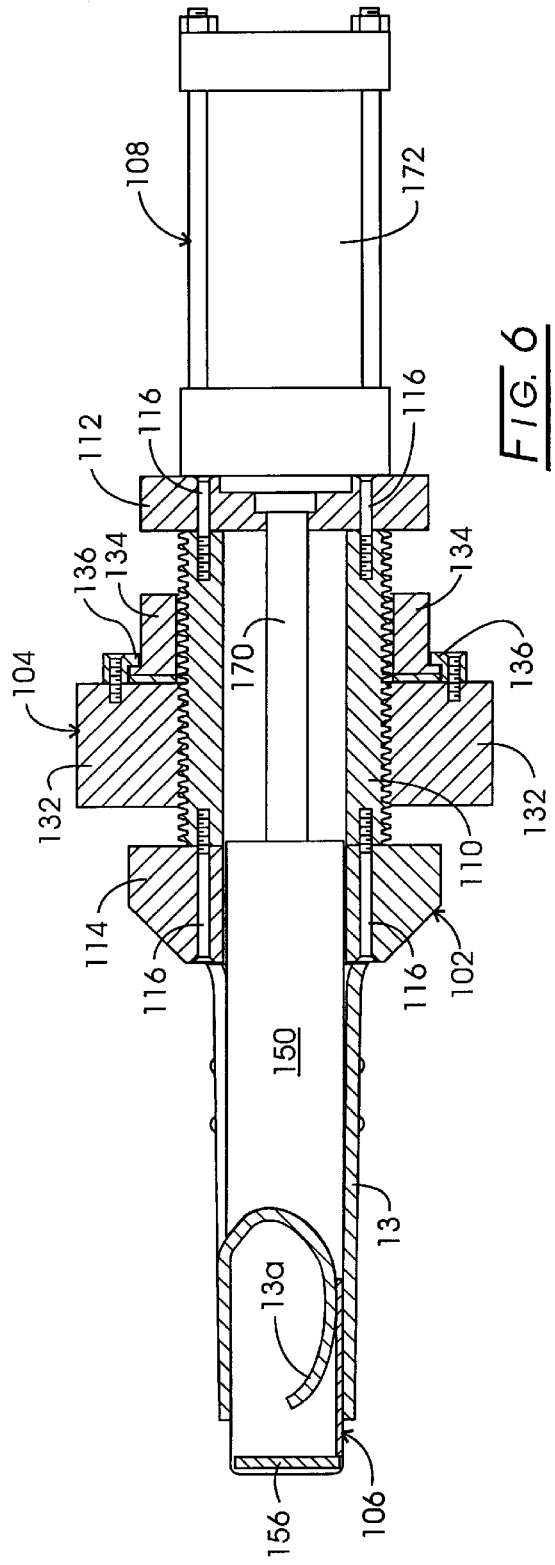

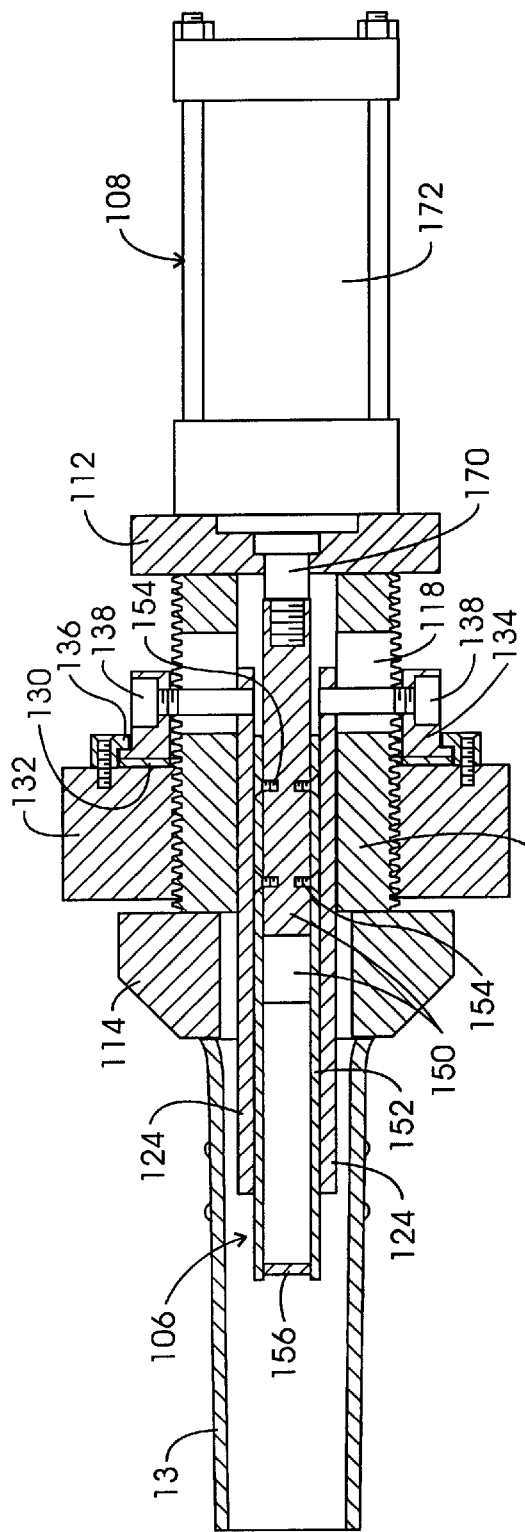
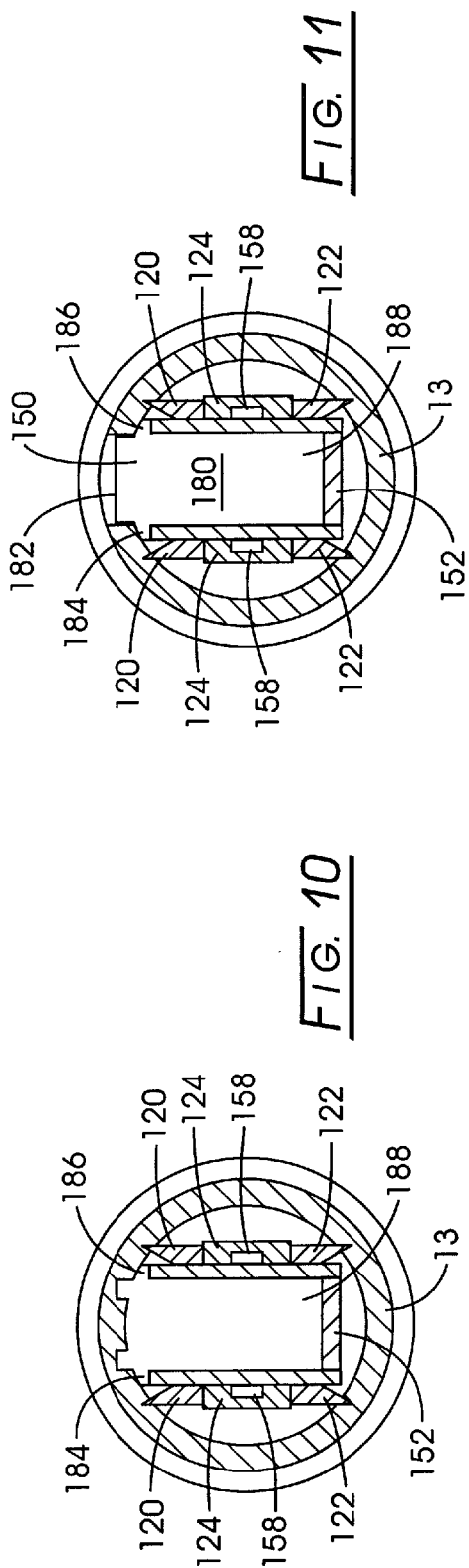
FIG. 9
FIG. 10
FIG. 11

US 6,209,181 B1

BOILER TUBE FLARE-END SEGMENT PEELER TOOL

CROSS-REFERENCES

None.

FIELD OF THE INVENTION

This invention pertains generally to power boilers, and specifically concerns apparatus that is particularly useful in connection with the maintenance removal of selected boiler tubes from being installed in a boiler drum wall as for subsequent replacement.

BACKGROUND OF THE INVENTION

The removal of water-tubes and fire-tubes from within power boilers for subsequent replacement using a tube-end gap-cutting tool of the type disclosed and claimed in U.S. Pat. No. 5,893,209 granted to Weeks et al. results in an intermediate-stage boiler tube flared-end segment that although having a pair of longitudinal gaps such gaps do not extend completely through the tube end wall material and the longitudinally-machined tube segment remains retained in the co-operating boiler drum wall. Such occurs because of a requirement to not cut into or otherwise damage drum wall metal. I have discovered that removal of the retained and gapped boiler tube flared-end segment is facilitated by use of a novel tool assembly that functions, by a shearing and bending action, to "peel" tube-end wall metal positioned between the spaced-apart machined longitudinal gaps in the tube end segment completely away from the boiler drum wall and without possibility of wall damage.

Other objects and advantages of the present invention will become apparent from a consideration of the descriptions, drawings, and claims which follow.

SUMMARY OF THE INVENTION

The present invention is basically an assembly comprised of: a threaded body subassembly; a clamp subassembly carried by the threaded body subassembly and adapted, when actuated, to clamp the tool assembly to the interior wall of the partially-gapped boiler tube-end that is to have its remaining gap metal removed by a "peeling" operation; a conventional pressurized-fluid actuator subassembly also carried by the tool threaded body subassembly and having an actuator cylinder and co-operating actuator piston rod; and a tool peeler blade subassembly connected to and reciprocated by the actuator subassembly piston rod.

The invention tool assembly is operated to sequentially clamp the assembly to the interior wall surface of the co-operating boiler tube end segment, engage and continuously bend and shear the between-gaps metal in the wall-retained boiler tube end-segment throughout the end-segment length during a tool assembly power stroke, retract the assembly peeler blade element, and release the tool assembly from clamped engagement with the boiler tube end-segment wall surface. The tube retained end-segment is then in a condition readied for subsequent tube diametric compression and withdrawal.

BRIEF DESCRIPTION OF THE DRAWINGS

FIG. 4 is a perspective view of the FIG. 3 boiler tube flared-end peeler tool;

FIG. 5 is an elevation section view of the invention tool co-operating with a gapped boiler tube flared-end segment taken at line 5—5 of FIG. 2 and at the beginning of a boiler tube flared-end gap metal peel step;

FIG. 6 is an elevation section view similar to FIG. 5 but not illustrating the invention tool at the end of a boiler tube flared-end gap metal peel step;

FIG. 9 is a plan section view taken at line 9—9 of FIG. 7;

FIG. 10 is a cross-section view taken at line 10—10 of FIG. 8;

FIG. 11 is a cross-section view taken at line 11—11 of FIG. 8; and

FIG. 12 is a perspective view of the tool assembly peeler blade element.

DETAILED DESCRIPTION

Figure 1:
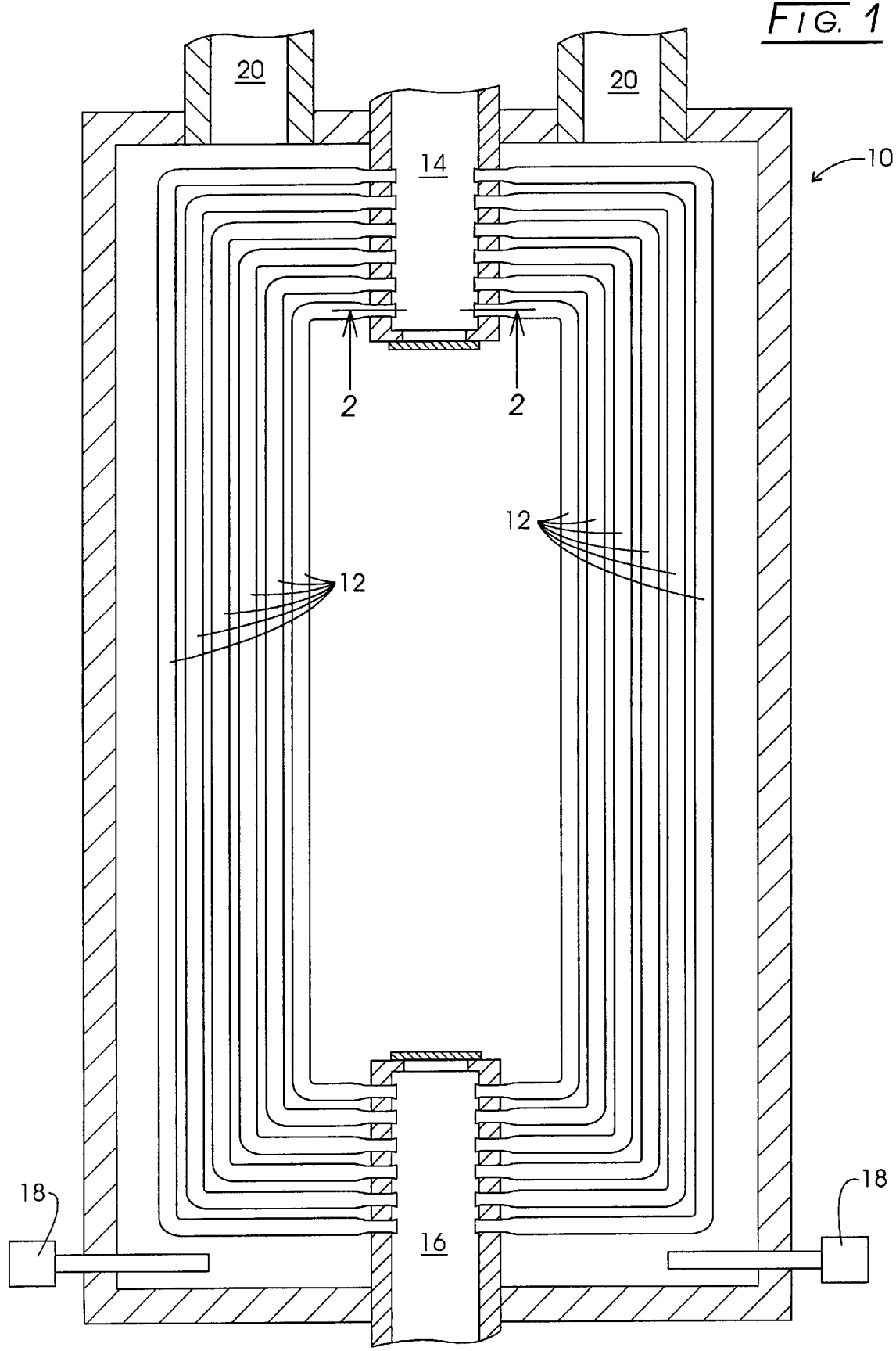
FIG. 1 is a schematic vertical section of a water-tube power boiler illustrating a typical environment in which the tool of the present invention is typically utilized.
Figure 2:
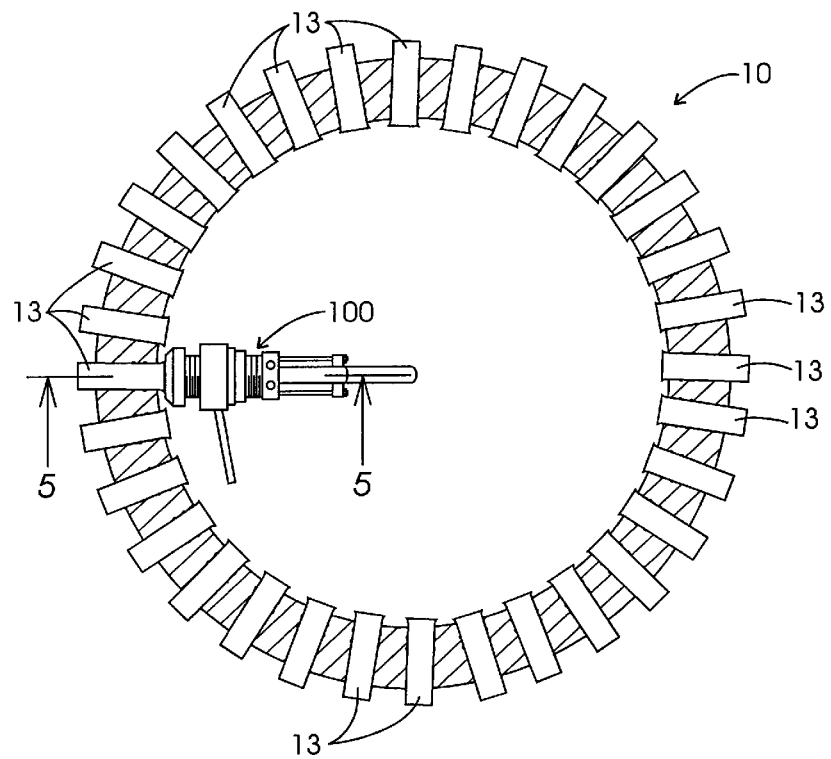
FIG. 2 is a section view taken at line 2—2 of FIG. 1 and illustrating the operating position of the tool of the present invention in the FIG. 1 boiler environment.

FIG. 1 schematically illustrates a power boiler 10 having multiple conventional boiler water-tubes 12 installed with their upper and lower flared ends co-operating with the walls of boiler steam and mud drums 14 and 16, respectively. Burners 18 are typically fired by a carbonaceous fuel, and the resulting effluent gasses of combustion, following heat extraction for water and steam heating purposes, are exhausted from within power boiler 10 through chimney connections 20. As with all power boilers, it is necessary from time to time to remove and replace one or more of individual boiler tubes 12 from within power boiler 10, and such is basically accomplished by selected tubes first being cut at their ends adjacent the exterior wall metal of drums 14 and 16 for removal. The boiler tube flared-end segment peeler tool 100 of the present invention pertains generally to the removal of the remaining tube flared-end segments 13 that are initially retained in the steam and mud drum peripheral walls and, as illustrated in FIG. 2, such tool is basically utilized from a position within or interior of the applicable boiler drum largely as a matter of convenience.

Figure 3:
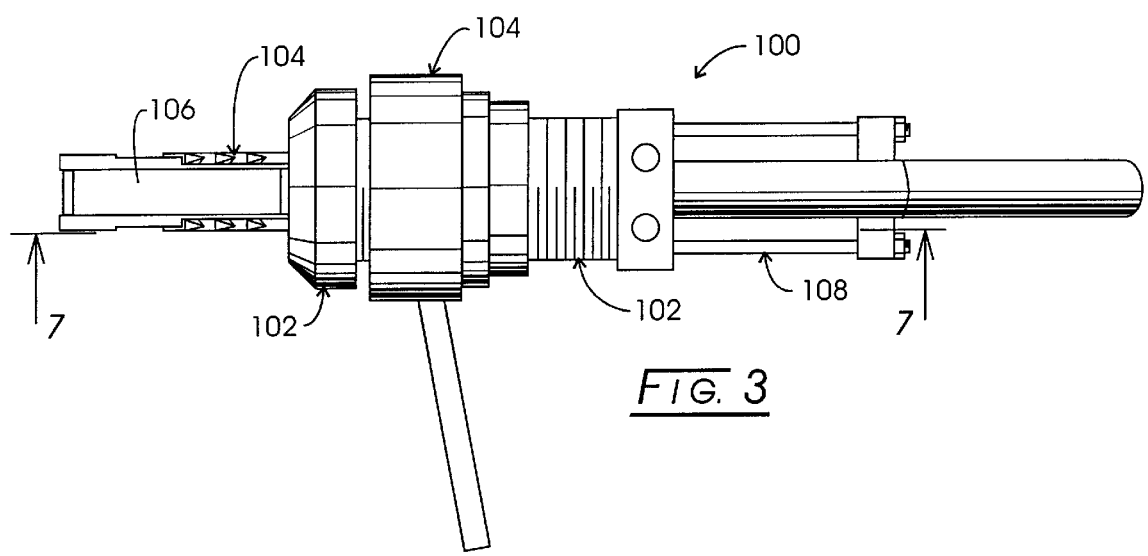
FIG. 3 is an enlarged plan view of the preferred embodiment of the boiler tube flared-end segment peeler tool of the present invention shown in its operating condition when ready for insertion into a longitudinally-grooved boiler tube flared-end segment.

In FIG. 3 of the drawings I illustrate a preferred embodiment of the tool assembly of the present invention, and such is designated 100 and is basically comprised of a tool body subassembly 102, a clamp subassembly 104 which co-operates with the body subassembly and which functions to securely clamp tool assembly 100 in a proper mounted position with a boiler tube end-segment during tool utilization, a peeler blade subassembly 106, and a conventional pressurized-fluid actuator subassembly 108, illustrated in a retracted operating condition, which is mounted on body subassembly 102 and which is connected to peeler blade subassembly 106 in powering relation. FIG. 4 illustrates tool assembly 100 in perspective.

FIGS. 5 and 6 illustrate tool body subassembly 102 as being comprised of a sleeve-like threaded body element 110, a support end plate element 112 securely attached to element 110 by threaded fasteners 116, and a stop end plate 114 also securely attached to element 110 by threaded fasteners designated 116. As best illustrated in FIG. 4, body element 110 includes a pair of integral opposite elongated slots 118 (only one of which is shown in FIG. 4) that accommodate longitudinal movement of a pair of clamp pivots which are included in clamp subassembly 104.

Figure 7:
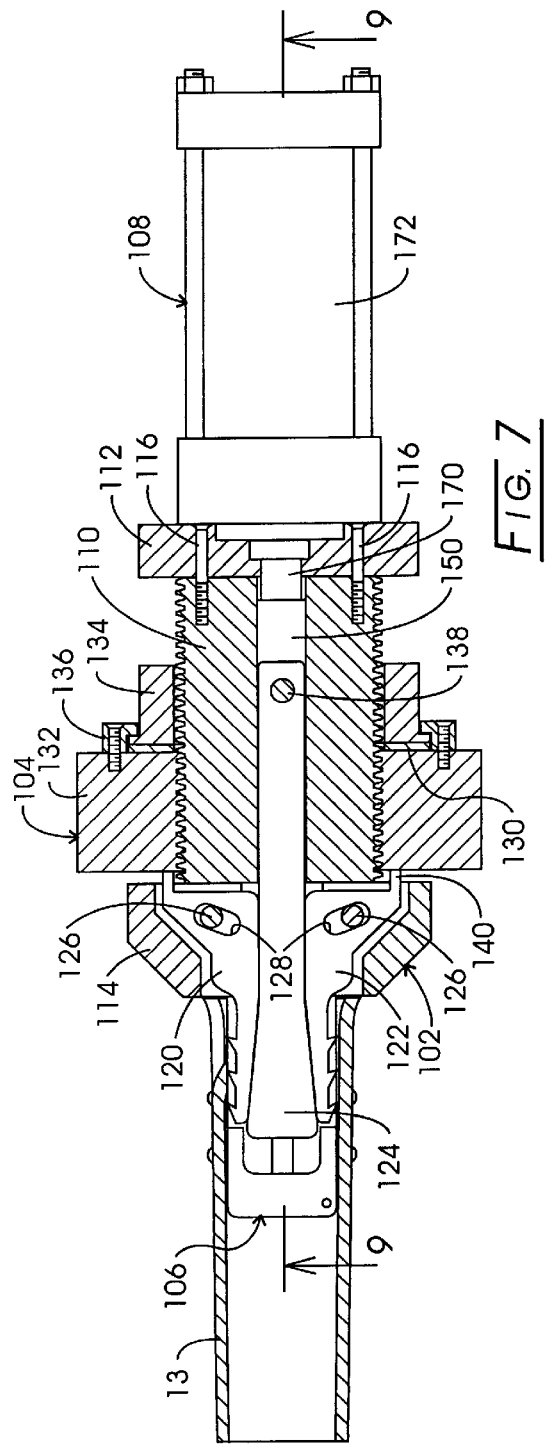
FIG. 7 is an elevation section view taken at line 7—7 of FIG. 3 and illustrating the invention tool in a pre-clamping operating condition.
Figure 8:
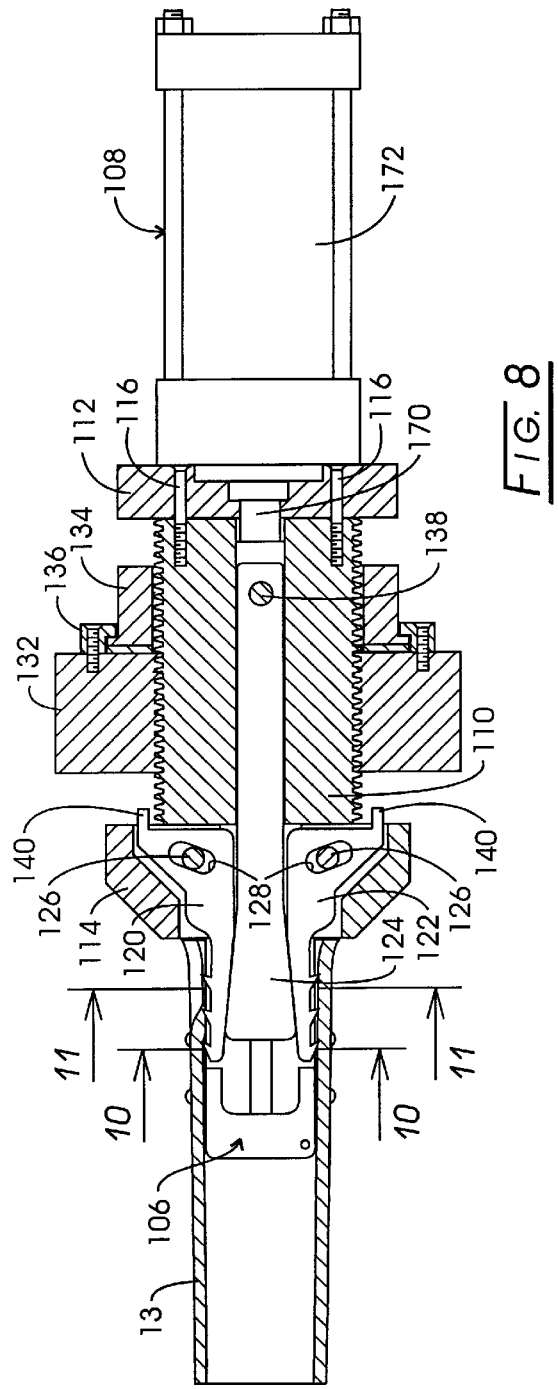
FIG. 8 is an elevation section view taken at similar to FIG. 7 but illustrating the invention tool in a fully-clamped operating condition.

Clamp subassembly, as best illustrated in FIGS. 7 and 8, is basically comprised a pair of toothed, spaced-apart, and pivoted clamp upper expansion jaw elements 120, a pair of toothed, spaced-apart, and pivoted clamp lower expansion jaw elements 122 (see FIGS. 9 and 10), and a pair of wedge elements 124 which pivotally expand the jaw element pairs into engagement with the interior surface of a boiler tube end-segment when retracted. Pairs of transverse pivots 126 are carried by stop end plate 114 and each co-operates with an elongated slot 128 provided in each jaw element 120 or 122. Clamping subassembly 104 also includes a removable handle 130 (see FIG. 4) that is used to manually turn threaded clamp sleeve 132 relative to co-operating threaded tool body element 110 to effect retraction and advancement of wedge element 124 in connection with clamping and releasing tool assembly 100 from engagement with boiler tube-end segment 12 prior to commencing and after completing the "peeling" operation that is to be performed.

A slip ring 134, that is longitudinally but not rotationally secured to threaded clamp sleeve 132 by retainer ring 136, carries transverse pin element 138 to complete the handle-to-wedge element connection. Such pin element reciprocates within longitudinal slot 118 provided in tool threaded body element 110. See FIG. 4. Also, each expansion clamp jaw element 120 and 122 is preferably provided with a projection tab element 140 that functions to disengage that element from clamping contact with a co-operating boiler tube-end segment when wedge elements 124 are advanced to their initial operating position (FIG. 7) when threaded clamp sleeve 132 contacts projection tabs 140 and causes rotational tool-releasing movement of clamp expansion jaws 120 and 122 about transverse pivots 126.

Tool peeler subassembly 106 includes a peeler blade element 150 that is secured in a channel member 152 by threaded fasteners 154 (see FIG. 9) and that is connected to and powered by piston rod element 170 of pressurized-fluid actuator subassembly 108. As shown in FIGS. 10 and 11, the upper extreme of each vertical leg of channel member 152 is rounded in cross-section, abuts the interior surface of tube segment 13 during tool assembly peeling operation, and functions as a shear shoulder. See FIG. 12 for a perspective illustration and additional details of the construction of invention blade element 150, which blade element, like channel member 152, is preferably fabricated of a conventional hardened cutting tool steel alloy. Channel member 152 has a pivoted end closure 156 that is retained in a closed position by conventional detents (not shown) and functions to retain within tool assembly 100 the curled remaining gap metal that is peeled from tube-end segment 13 by tool operation. Also, and as best illustrated in FIG. 4, each vertical wall of channel member 152 is preferably provided with an integral rib element 158 that co-operates with an integral groove formed in the adjacent wedge element 124.

Conventional reversible pressurized-fluid actuator assembly 108 is preferably removably mounted on support end plate element 112 and is basically comprised of, in addition to piston rod element 170, an actuator cylinder element 172 that internally contains an actuator piston joined to piston rod element 170, and actuator reversing controls 174. Not shown in the drawings are details of conventional source of pressurized operating fluid for actuator subassembly 108 and necessary to power tool assembly 100.

FIG. 12 is provided in the drawings to more clearly illustrate important features of peeler tool element 150. Important to that element are the illustrated tool lip surface area 180 whose upper edge 182 is positioned a fixed distance above integral paired shoulders 184 and 186 (see FIG. 11) that assures that any part of tool lip 180 will not contact boiler drum wall metal when such shoulders are in contact with the interior surface of boiler tube flared-end segment 13. In element 150 tool lip 180 is joined to a contiguous curved end curling surface 188 that, when engaged with the down-turned gap end metal 13a of tube segment 13 and advanced toward the tool assembly peeler actuation stroke end, causes that down-turned gap metal to be further peeled from tube end segment 13 as best shown in FIG. 6.

When utilizing tool assembly 100 in a typical boiler tube end-segment removal operation the initial step is to insert the assembly forward end into the drum-retained boiler tube end-segment until the vertical face of stop end plate element 114 contacts the tube segment flared end. Next, and using handle 130, clamp subassembly threaded sleeve 132 is manually rotated to move wedge elements 124 in an aft direction until clamp expansion jaw elements 120 and 122 are engaged with the tube segment wall interior surface as shown in FIG. 8 to securely clamp or lock the tool assembly in its operating position. The pressurized-fluid actuator subassembly 108 is then operated to cause peeler blade element 150 to be moved in a forward direction to first engage down-turned gap metal 13a at the retained tube flared end (FIG. 5) and progressively peel the remaining gap metal by combined bending and shearing until that gap metal is separated completely from the tube-end segment (FIG. 6). Afterwards peeler blade element 150 is retracted to its initial position. To accomplish this threaded clamp sleeve 132 is turned in an opposite direction to engage tabs 140 of blades (120 and 122) (FIGS. 7 and 8) to rotate clamp expansion jaw elements 120 and 122 out of engagement with the tube-end segment interior surface thus freeing tool assembly 100 from being retained in a clamped condition. Lastly assembly 100 is withdrawn from engagement with boiler tube flared-end segment 13 to ready such segment for subsequent tube removal steps of segment diametric compression and longitudinal withdrawal from within the boiler drum wall.

I claim, as my invention:

1. A peeler tool assembly useful in connection with the removal of a co-operating, longitudinally partially gapped, boiler tube flared-end segment from retention within a power boiler drum wall, and comprising:

a tool body subassembly having a sleeve-like threaded body element, a mounting end plate secured to one end of said threaded body element, and a stop end plate secured to an opposite end of said threaded body element;

a pressurized-fluid actuator subassembly supported by said tool body subassembly mounting end plate and wherein said actuator subassembly has an extendible and retractable actuator piston rod;

a clamp subassembly having a threaded clamp sleeve co-operating with said tool body subassembly threaded body element, two pairs of opposite and rotatable clamp expansion jaw elements pivotally carried by said tool body subassembly stop end plate, and a pair of wedge elements located interiorly of said tool body subassembly sleeve-like threaded body element and adapted to bias said clamp expansion jaw elements outwardly against the interior wall surface of the boiler tube flared-end segment when actuated; and a peeler tool blade subassembly having integral shear shoulder elements and an extendible and retractable peeler blade element joined to said integral shear shoulder elements which is movably powered by said actuator subassembly actuator piston rod selectively in forward or aft directions, wherein said peeler blade element has a lip surface with an upper edge that is positioned a fixed distance above said peeler tool blade subassembly integral shear shoulder elements that is less than the wall thickness of the boiler tube flared-end segment wall, and a curved end curling surface contiguous to said lip surface such that said peeler blade subassembly peeler blade element bends and shears the retained longitudinal gap metal in the boiler tube flared-end segment against said integral shear shoulder elements when operationally moved within the boiler tube flared-end segment in a forward direction by said actuator subassembly actuator piston rod.

2. The peeler tool assembly defined by claim 1, and wherein said clamp subassembly two pairs of opposite and rotatable clamp expansion jaw elements are each provided with toothed jaw elements having teeth that contact and become embedded in the interior wall surface of the boiler tube flared-end segment when actuated by said clamp subassembly pair of wedge elements.

3. The peeler tool assembly defined by claim 2, and wherein said clamp subassembly two pairs of opposite and rotatable clamp expansion jaw elements each have multiple teeth with sloped tooth edges alternated with vertical tooth edges, said alternated sloped tooth edges being oriented to resist displacement of said tooth edges relative to the boiler tube flared-end segment when said peeler blade subassembly is moved in a forward direction by said actuator subassembly.

4. The peeler tool assembly defined by claim 1, and wherein said two pairs of opposite and rotatable clamp expansion jaw elements are positioned laterally with respect to each other at either side of and adjacent said peeler blade subassembly.

5. The peeler tool assembly defined by claim 1, and wherein said two pairs of opposite and rotatable clamp expansion jaw elements each have a projection tab element which extends outwardly of said stop end plate adapted to be engaged by said threaded clamp sleeve to release said clamp expansion jaw elements from engagement with said interior wall surface.

6. The peeler tool assembly defined by claim 1, and wherein said clamp subassembly pair of wedge elements are connected to a threaded sleeve element that effects linear movement of said wedge elements to rotate and expand said two pairs of opposite and rotatable expansion jaw elements, said threaded sleeve rotatably co-operating with said tool body subassembly threaded body element.

7. The peeler tool assembly defined by claim 1, and wherein said peeler tool blade subassembly further comprises a channel member joined to and containing said peeler blade element, said channel member having upstanding leg elements whose upper extremes comprise said peeler tool blade subassembly shear shoulder elements.

* * * * *